United States Patent
Ricketts et al.

(10) Patent No.: US 10,368,492 B2
(45) Date of Patent: Aug. 6, 2019

(54) RASP BAR FOR A COMBINE

(71) Applicant: CNH Industrial America LLC, New Holland, PA (US)

(72) Inventors: Jonathan E. Ricketts, Coal Valley, IL (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 454 days.

(21) Appl. No.: 14/877,127

(22) Filed: Oct. 7, 2015

(65) Prior Publication Data
US 2017/0099776 A1    Apr. 13, 2017

(51) Int. Cl.
| | |
|---|---|
| *A01F 12/20* | (2006.01) |
| *A01F 12/18* | (2006.01) |
| *A01F 7/06* | (2006.01) |
| *A01F 12/22* | (2006.01) |

(52) U.S. Cl.
CPC ............... *A01F 12/20* (2013.01); *A01F 7/06* (2013.01); *A01F 7/067* (2013.01); *A01F 12/18* (2013.01); *A01F 12/22* (2013.01)

(58) Field of Classification Search
CPC .......... A01F 12/20; A01F 12/22; A01F 12/18; A01F 7/06; A01F 7/067; A01F 7/065
See application file for complete search history.

(56) References Cited

U.S. PATENT DOCUMENTS

| | | | | |
|---|---|---|---|---|
| 5,229 | A | * | 8/1847 | Anthony ................ A01F 12/20 460/75 |
| 855,461 | A | | 6/1904 | Laczay et al. |
| 911,157 | A | | 2/1909 | Rechtenbach |
| 918,857 | A | | 4/1909 | Jacobson et al. |
| 1,169,040 | A | * | 1/1916 | Koger .................... A01F 12/20 460/103 |
| 1,203,094 | A | | 10/1916 | Bordeau et al. |
| 2,256,010 | A | | 9/1941 | Ausherman |
| 2,298,445 | A | | 10/1942 | Welty |
| 2,349,380 | A | | 5/1944 | Rietz |
| 4,889,517 | A | * | 12/1989 | Strong ...................... A01F 7/06 460/66 |

(Continued)

FOREIGN PATENT DOCUMENTS

DE     304618     3/1918

OTHER PUBLICATIONS

European Search Report; 16192187.9; dated Feb. 22, 2017.

*Primary Examiner* — Thomas B Will
*Assistant Examiner* — Joan D Misa
(74) *Attorney, Agent, or Firm* — Patrick M. Sheldrake; Peter K. Zacharias (57) ABSTRACT

An agricultural harvester has a chassis carrying a threshing and separating system for separating grain from Material Other than Grain (MOG). The threshing and separating system has a threshing rotor and at least one concave. At least one rasp bar is attached to the threshing rotor. The at least one rasp bar has an upper threshing surface and a trailing surface. The trailing surface is set at a draft angle. At least one trailing surface interrupter is located on the trailing surface and may be inclined slightly rearward from vertical. The trailing surface interrupters may be used with rasp bars with or without rasp bar spikes.

14 Claims, 6 Drawing Sheets

(56) References Cited

U.S. PATENT DOCUMENTS

| | | | | |
|---|---|---|---|---|
| 4,936,810 | A | * | 6/1990 | Strong ................... A01F 7/06 460/69 |
| 4,946,419 | A | * | 8/1990 | Cromheecke ............ A01F 7/06 460/122 |
| 5,035,675 | A | * | 7/1991 | Dunn ..................... A01F 7/06 460/122 |
| 5,125,871 | A | * | 6/1992 | Gorden .................. A01F 12/22 460/69 |
| 5,192,245 | A | * | 3/1993 | Francis .................. A01F 7/06 460/110 |
| 5,624,314 | A | | 4/1997 | Welch |
| 5,919,086 | A | * | 7/1999 | Derry .................... A01F 12/20 460/149 |
| 8,087,982 | B1 | * | 1/2012 | Kile ...................... A01F 12/22 460/71 |
| 9,807,939 | B1 | * | 11/2017 | Kile ...................... A01F 12/22 |
| 2012/0214560 | A1 | | 8/2012 | Murray et al. |
| 2017/0099776 | A1 | * | 4/2017 | Ricketts ................. A01F 12/20 |

\* cited by examiner

RASP BAR FOR A COMBINE

BACKGROUND OF THE INVENTION

1. Field of the Invention

The present invention relates to agricultural harvesters such as combines, and, more particularly, to rasp bars used on the threshing rotor in the harvester crop processing section of the combine.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement.

Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more threshing rotors which can extend axially (front to rear) or transversely within the body of the combine, and which are partially or fully surrounded by a perforated concave. Again, the one or more threshing rotors are provided with rasp bars that interact with the crop matter to separate grain and to provide positive crop movement. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

Rasp bars for use on threshing rotors come in various profiles. Most have an upper threshing surface that faces the inside of the concaves with some ribbing or serrations that assist in threshing the crop material. It is known to provide rasp bars with a trailing surface with a draft angle in order to help move crop material through the threshing and separating system. However, after time, performance of the threshing and separating system becomes impaired, particularly as the rasp bars wear and the surfaces of the rasp bars become smoother. It is further known to utilize a rasp bar spike located on the upper threshing surface of the rasp bars in order to attempt to improve threshing of the crop material.

Accordingly, what is needed in the art is a way to lift the crop material away from the surface of the rotor outward towards the concaves, thereby increasing the mixing of the crop and ensuring better separation of grain from Material Other than Grain (MOG). What is further needed in the art is an increase in the threshing ability if the rasp bars, while ensuring the continued rearward transport of the crop material through the rotary threshing or separating system.

SUMMARY OF THE INVENTION

The present invention provides such a way to lift the crop material away from the surface of the rotor outward towards the concaves, thereby increasing the mixing of the crop and ensuring better separation of grain from MOG. The present invention further provides an increase in the threshing ability of the rasp bars, while ensuring the continued rearward transport of the crop material through the rotary threshing or separating system. The present invention provides rasp bars with a flat and angled trailing surface that has at least one trailing surface interrupter protruding outwardly therefrom such that said flat and angled trailing surface directs a crop material rearwardly and said at least one trailing surface interrupter extending above the trailing surface redirects the crop material rearwardly and outwardly toward said at least one concave.

The present invention may utilize trailing surface interrupters that are formed into the trailing surface of rasp bars. Each trailing surface interrupter may be in the form of a linear protrusion having a trapezoidal cross section, the trapezoidal cross section being one of an acute trapezoidal cross section, a right trapezoidal cross section, an obtuse trapezoidal cross section, an isosceles trapezoidal cross section, a rectangular trapezoidal cross section, or a square trapezoidal cross section. Each trailing surface interrupter may inclined slightly rearward from vertical, so that the trailing surface interrupter angle from the lower surface of the rasp bar may be between about 95 and about 120 degrees, more particularly about 105 degrees.

The trailing surface interrupters according to alternative embodiments of the present invention may be incorporated into rasp bars having rasp bar spikes, so that at least one of the trailing surface interrupters extends upwards into the portion of trailing surface defined by the rasp bar spike. Alternatively, the trailing surface interrupters according to another embodiment of the present invention may be incorporated into rasp bars not having rasp bar spikes. In another embodiment of the present invention, the trailing surface interrupters may be in the form of broken linear protrusions having trapezoidal cross sections and inclined slightly rearward from vertical. In another embodiment of the present invention, the trailing surface interrupters may be in the form of linear protrusions having semi-cylindrical cross sections and inclined slightly rearward from vertical. In another embodiment of the present invention, the trailing surface interrupters may be in the form of individual protrusions having semi-spherical or conical cross sections, distributed over the face of trailing surface.

In one form, the invention is directed to an agricultural harvester having a chassis carrying a threshing and separating system for separating grain from MOG. The threshing and separating system has a threshing rotor and at least one concave. At least one rasp bar is attached to the threshing rotor. The at least one rasp bar has an upper threshing surface and a trailing surface. The trailing surface is set at a draft angle of between about 10 and about 30 degrees. At least one trailing surface interrupter is located on the trailing surface.

In another form, the invention is directed to a rasp bar for use on a threshing rotor of a threshing and separating system of an agricultural harvester. The rasp bar has a rasp bar body with an upper threshing surface and a trailing surface. The trailing surface is set at a draft angle of between about 10 and about 30 degrees. At least one trailing surface interrupter is located on the trailing surface.

In another form, the invention is directed to a method of threshing and separating grain from MOG in agricultural harvester. The method includes several steps. The first step is providing a threshing and separating system for separating grain from MOG. The threshing and separating system has a threshing rotor and at least one concave. The second step is attaching at least one rasp bar to the threshing rotor. The at least one rasp bar has an upper threshing surface and a trailing surface. The trailing surface is set at a draft angle of between about 10 and about 30 degrees. The third step is providing at least one trailing surface interrupter located on the trailing surface. The at least one trailing surface interrupter is in the form of a linear protrusion arranged at an angle β of about 105 degrees from the lower surface of the at least one rasp bar.

An advantage of the present invention is that the trailing surface of the rasp bars not only assists in threshing the crop material by virtue of the additional aggressiveness of the trailing surface interrupters, but also the trailing surface interrupters more effectively move the crop material outward from the threshing rotor towards the concaves. This movement of the crop material outward increases the mixing of the crop material, thereby ensuring better separation of the grain from the MOG.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
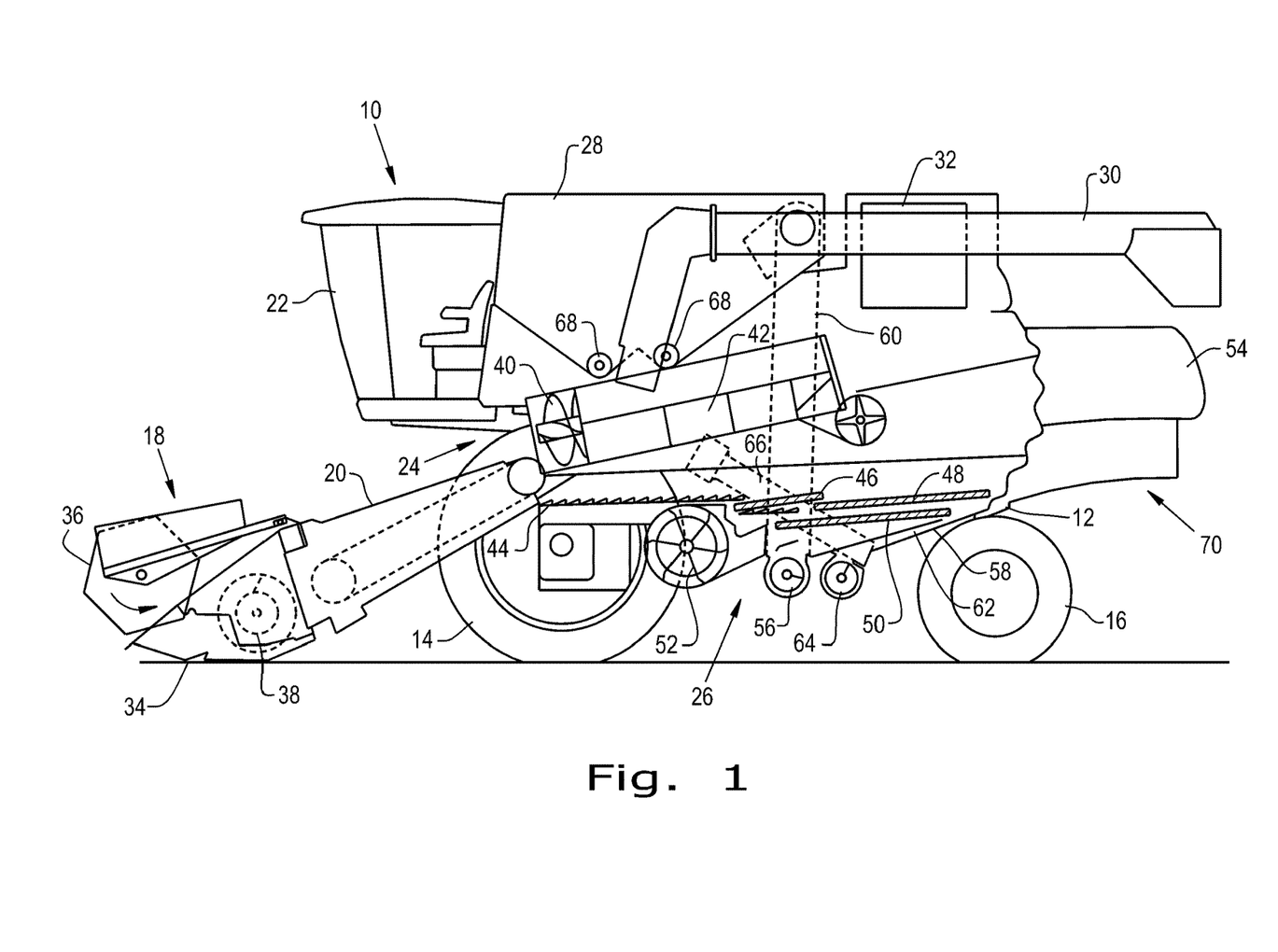
FIG. 1 is a side view of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading conveyance 30. Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a threshing rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of the residue handling system 70 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
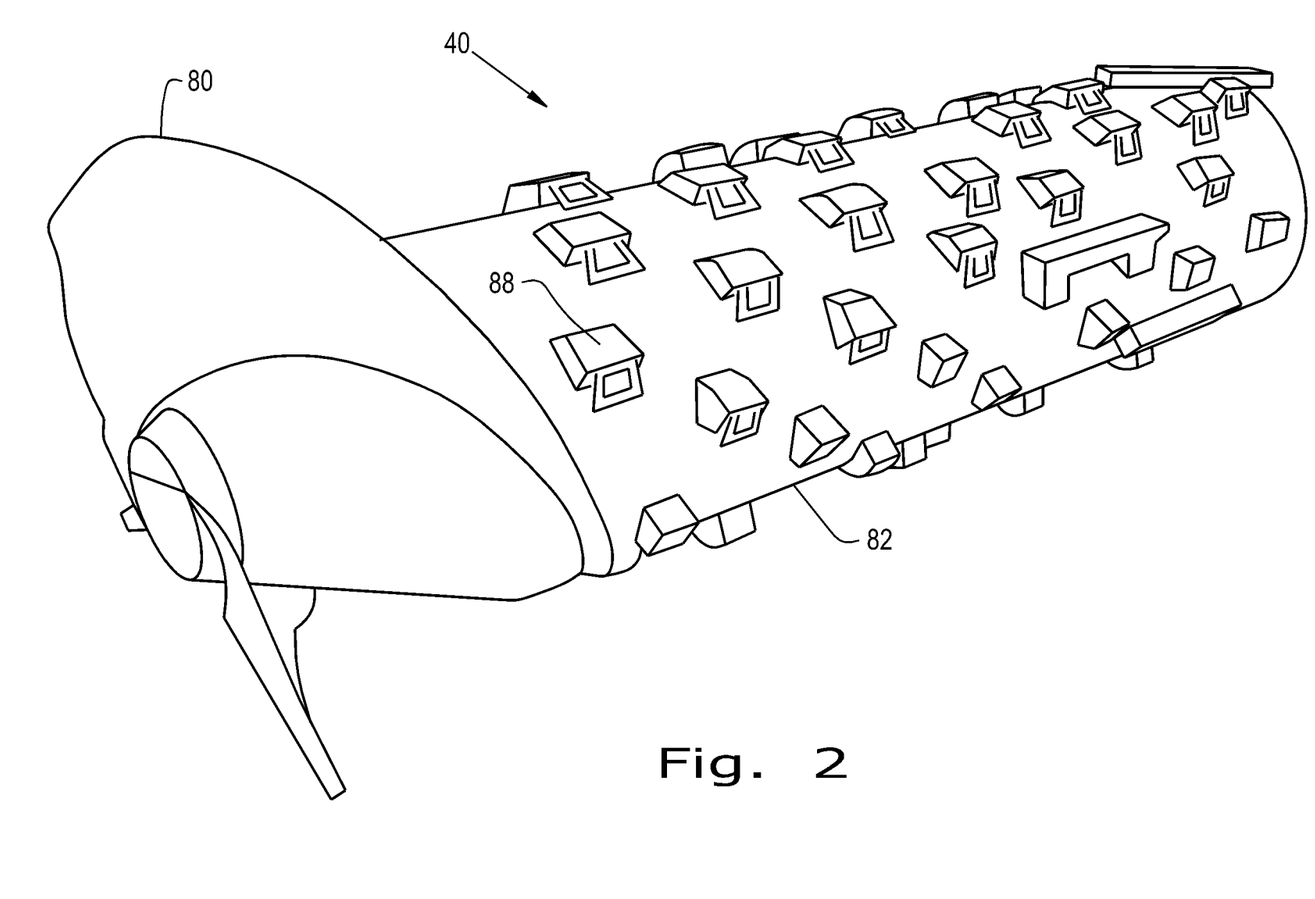
FIG. 2 is a perspective view of a threshing rotor having rasp bars according to an embodiment of the present invention.
Figure 3:
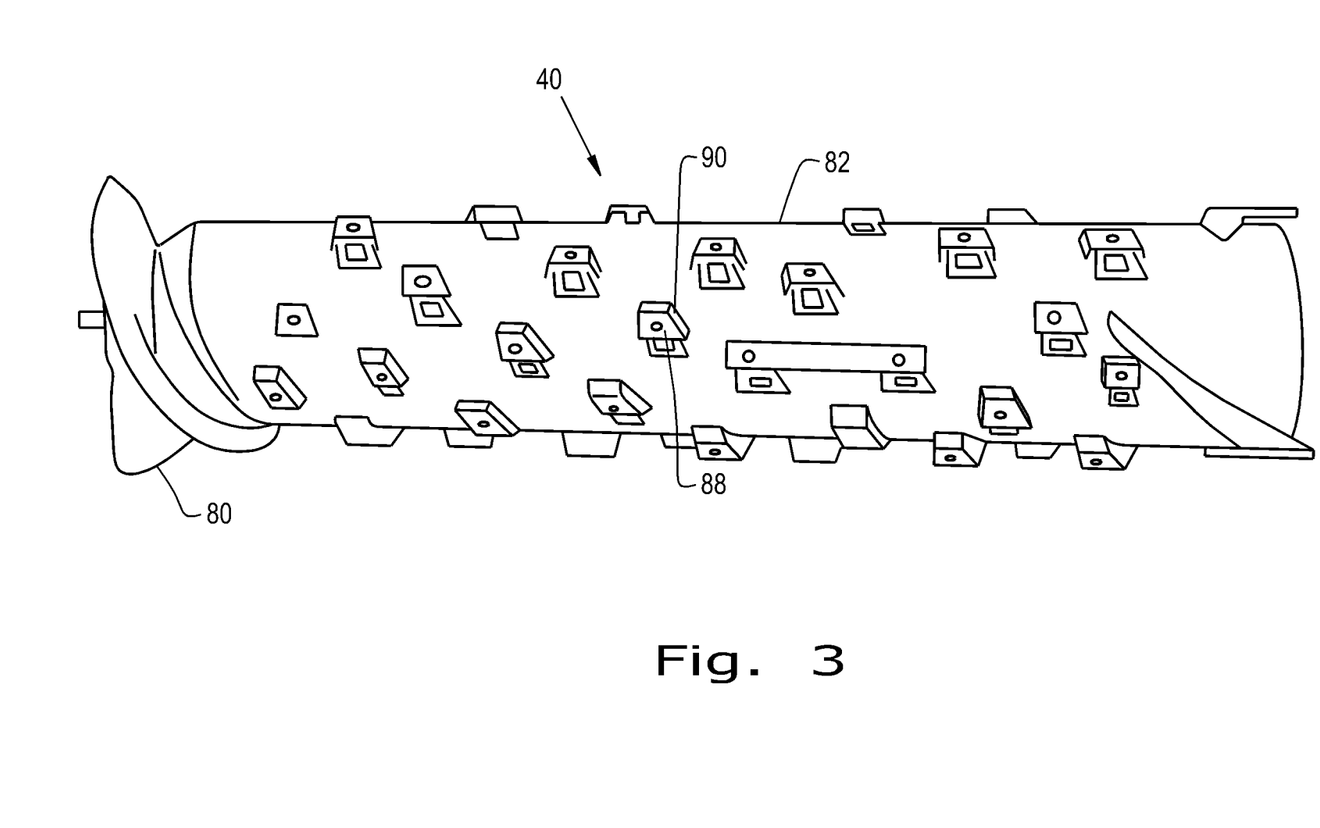
FIG. 3 is a perspective view of a threshing rotor having rasp bars according to an embodiment of the present invention.

Referring now to FIGS. 2 and 3, there is shown a threshing rotor 40, shown removed from the threshing and separating system 24. The threshing rotor 40 has a rotor body 82 and an intake auger 80. Rasp bars 84 are arranged in a staggered formation along the rotor body 82, and function both to thresh the crop material against concaves 42 (not shown in FIGS. 2 and 3) and to provide positive crop material movement through the threshing and separating system 24. Each rasp bar 84 has an upper threshing surface 88 that serves to further thresh the crop material, and a trailing surface 90 that serves to both thresh the crop material and to move the crop material rearward between the threshing rotor 40 and the concaves 42.

Figure 4:
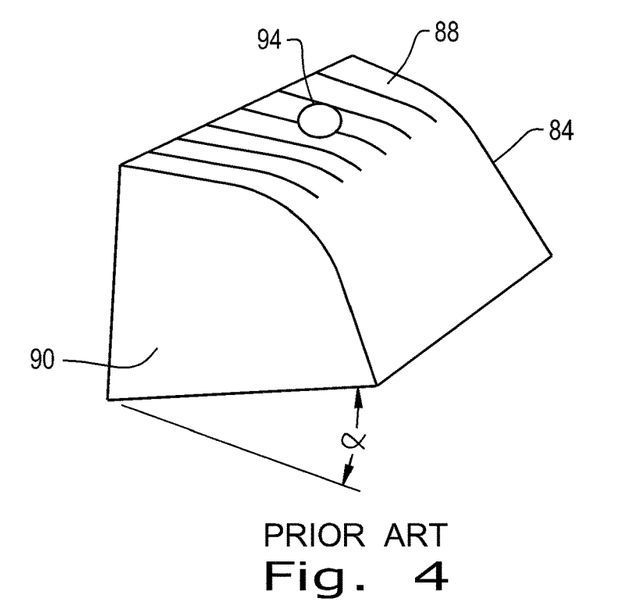
FIG. 4 is a perspective view of a rasp bar.

FIG. 4 shows an isometric view of a known rasp bar 84 having an upper threshing surface 88 and a trailing surface 90. The trailing surface 90 is set at a draft angle α in order to help move the crop material rearward. Draft angle α may be between 10 and 30 degrees. Note that the rasp bar 84 in FIG. 4 is shown from the rearward end of the threshing rotor 40, so that the trailing surface 90 faces in the direction of crop material flow through the threshing and separating system 24. The rasp bar 84 is provided with an attachment provision 94, in this case a hole for a fastener.

Figure 5:
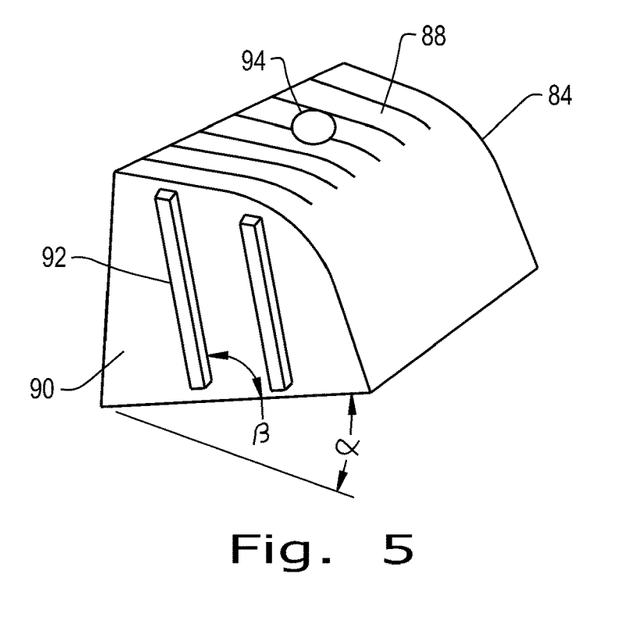
FIG. 5 is a perspective view of a rasp bar according to an embodiment of the present invention.

FIG. 5 shows an isometric view of a rasp bar 84 according to an embodiment of the present invention. The rasp bar 84 again has an upper threshing surface 88, a trailing surface 90, and an attachment provision 94. The trailing surface 90 is again set at a draft angle α of between 10 and 30 degrees. According to the embodiment of the present invention shown in FIG. 5, trailing surface interrupters 92 are formed into the trailing surface 90 in the form of linear protrusions having trapezoidal cross section, which trapezoidal cross section may, for example, be an acute trapezoidal cross section, a right trapezoidal cross section, an obtuse trapezoidal cross section, an isosceles trapezoidal cross section, a rectangular trapezoidal cross section, or a square trapezoidal cross section. Each trailing surface interrupter 92 is inclined slightly rearward from vertical, so that the trailing surface interrupter angle β may be between about 95 and about 120 degrees, preferably about 105 degrees. In this way, the trailing surface 90 not only assists in threshing the crop material by virtue of the additional aggressiveness of the trailing surface interrupters 90, but also the trailing surface interrupters 90 more effectively move the crop material outward from the threshing rotor 40 towards the concaves 42 (not shown in FIG. 5). This movement of the crop material outward increases the mixing of the crop material, thereby ensuring better separation of the grain from the MOG.

Figure 6:
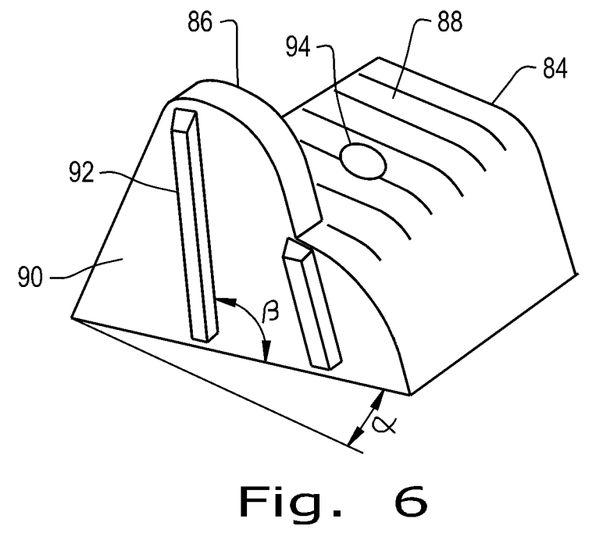
FIG. 6 is a perspective view of a rasp bar according to another embodiment of the present invention.

FIG. 6 shows an isometric view of a rasp bar 84 according to another embodiment of the present invention. The rasp bar 84 again has an upper threshing surface 88, a trailing surface 90, and an attachment provision 94. The trailing surface 90 is again set at a draft angle α of between 10 and 30 degrees. Trailing surface interrupters 92 are again formed into the trailing surface 90 in the form of linear protrusions having trapezoidal cross sections and inclined slightly rearward from vertical, so that the trailing surface interrupter angle β may be between about 95 and about 120 degrees, preferably about 105 degrees. The embodiment of the present invention shown in FIG. 6 is shown as incorporated in a rasp bar 84 having a rasp bar spike 86, so that at least one of the trailing surface interrupters 92 extends upwards into the portion of trailing surface 90 defined by the rasp bar spike 86.

Figure 7:
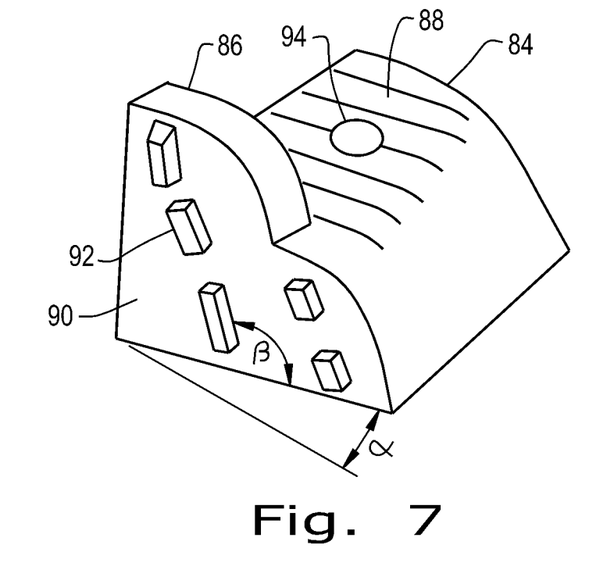
FIG. 7 is a perspective view of a rasp bar according to another embodiment of the present invention.

FIG. 7 shows an isometric view of a rasp bar 84 according to another embodiment of the present invention. The rasp bar 84 again has an upper threshing surface 88, a trailing surface 90 set at a draft angle α of between 10 and 30 degrees, and an attachment provision 94. Trailing surface interrupters 92 are again formed into the trailing surface 90, in this case in the form of broken linear protrusions having trapezoidal cross sections and inclined slightly rearward from vertical, so that the trailing surface interrupter angle β may be between about 95 and about 120 degrees, preferably about 105 degrees. The embodiment of the present invention shown in FIG. 7 is shown as incorporated in a rasp bar 84 having a rasp bar spike 86, so that at least one of the broken linear protrusions of the trailing surface interrupters 92 extends upwards into the portion of trailing surface 90 defined by the rasp bar spike 86. However, it is contemplated that the broken linear protrusion trailing surface interrupters 92 may also be embodied on a rasp bar 84 not having a rasp bar spike 86.

Figure 8:
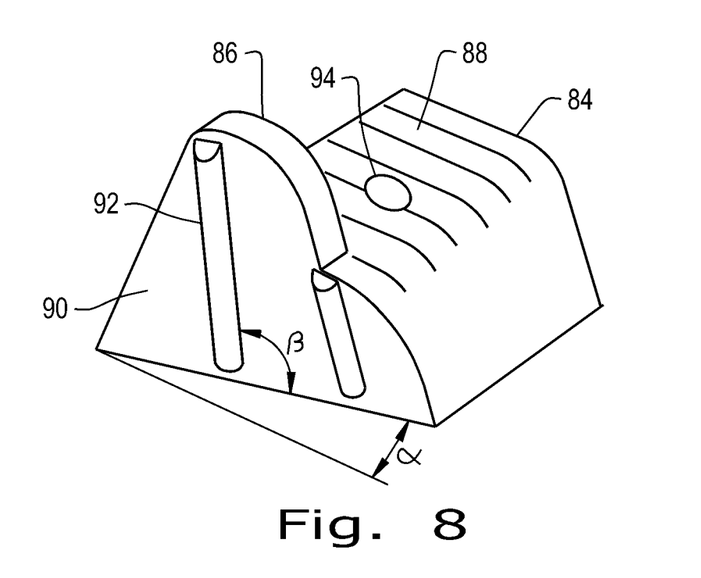
FIG. 8 is a perspective view of a rasp bar according to another embodiment of the present invention.

FIG. 8 shows an isometric view of a rasp bar 84 according to another embodiment of the present invention. The rasp bar 84 again has an upper threshing surface 88, a trailing surface 90 set at a draft angle α of between 10 and 30 degrees, and an attachment provision 94. Trailing surface interrupters 92 are again formed into the trailing surface 90, in this case in the form of linear protrusions having semi-cylindrical cross sections and inclined slightly rearward from vertical, so that the trailing surface interrupter angle β may be between about 95 and about 120 degrees, preferably about 105 degrees. The embodiment of the present invention shown in FIG. 8 is again shown as incorporated in a rasp bar 84 having a rasp bar spike 86, so that at least one of the semi-cylindrical linear protrusions of the trailing surface interrupters 92 extends upwards into the portion of trailing surface 90 defined by the rasp bar spike 86. However, it is contemplated that the semi-cylindrical linear protrusion trailing surface interrupters 92 may also be embodied on a rasp bar 84 not having a rasp bar spike 86.

Figure 9:
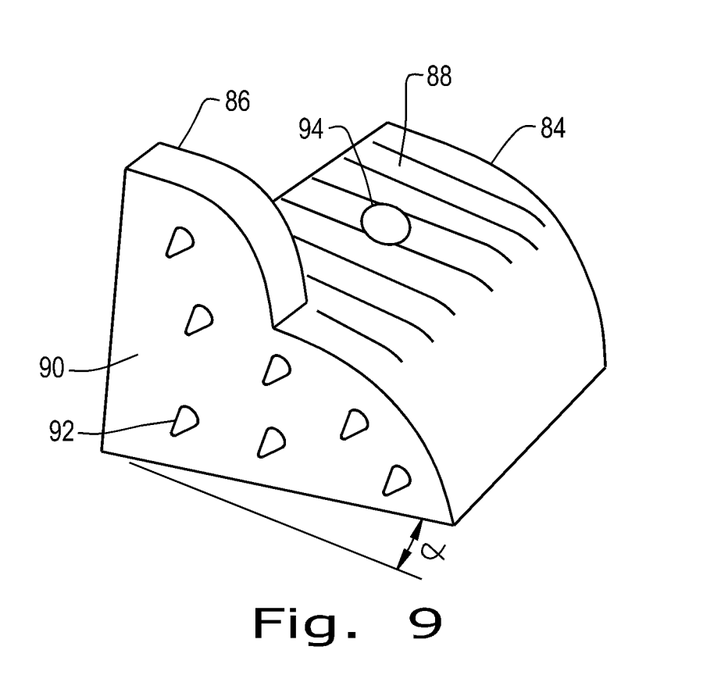
FIG. 9 is a perspective view of a rasp bar according to another embodiment of the present invention.

FIG. 9 shows an isometric view of a rasp bar 84 according to another embodiment of the present invention. The rasp bar 84 again has an upper threshing surface 88, a trailing surface 90 set at a draft angle α of between 10 and 30 degrees, and an attachment provision 94. Trailing surface interrupters 92 are again formed into the trailing surface 90, in this case in the form of individual protrusions having semi-spherical or conical cross sections, distributed over the face of trailing surface 90. The embodiment of the present invention shown in FIG. 9 is again shown as incorporated in a rasp bar 84 having a rasp bar spike 86, so that at least one of the semi-spherical or conical protrusions of the trailing surface interrupters 92 is located on the portion of the trailing surface 90 defined by the rasp bar spike 86. However, it is contemplated that the semi-spherical or conical protrusion trailing surface interrupters 92 may also be embodied on a rasp bar 84 not having a rasp bar spike 86.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a chassis carrying a threshing and separating system for separating grain from Material Other than Grain (MOG), said threshing and separating system having a threshing rotor and at least one concave;
at least one rasp bar attached to said threshing rotor, said at least one rasp bar having an upper threshing surface and a trailing surface, said trailing surface being flat and set at a draft angle of between about 10 and about 30 degrees;
at least one trailing surface interrupter, in the form of a linear protrusion, located on said trailing surface at an angle β and protruding outwardly therefrom such that said flat and angled trailing surface directs a crop material rearwardly and said at least one trailing surface interrupter extending above the trailing surface redirects the crop material rearwardly as well as outwardly toward said at least one concave.

2. The agricultural harvester of claim 1, wherein:
said at least one trailing surface interrupter being at the angle β which is between about 95 and about 120 degrees from a lower surface of said at least one rasp bar.

3. The agricultural harvester of claim 2, wherein:
said at least one trailing surface interrupter being at an angle β of about 105 degrees from the lower surface of said at least one rasp bar.

4. The agricultural harvester of claim 1, wherein:
said linear protrusion having a trapezoidal cross section, said trapezoidal cross section being one of an acute trapezoidal cross section, a right trapezoidal cross section, an obtuse trapezoidal cross section, an isosceles trapezoidal cross section, a rectangular trapezoidal cross section, and a square trapezoidal cross section.

5. The agricultural harvester of claim 1, wherein:
said linear protrusion having a semi-cylindrical cross section.

6. The agricultural harvester of claim 1, wherein:
said linear protrusion being a broken linear protrusion.

7. The agricultural harvester of claim 1, wherein:
said at least one rasp bar further having a rasp bar spike, said at least one trailing surface interrupter extending at least partially onto said rasp bar spike.

8. A rasp bar for use on a threshing rotor of a threshing and separating system of an agricultural harvester, comprising:
a rasp bar body having an upper threshing surface and a trailing surface, said trailing surface being flat and set at a draft angle of between about 10 and about 30 degrees;
at least one trailing surface interrupter, in the form of a linear protrusion, located on said trailing surface at angle β and protruding outwardly therefrom such that said flat and angled trailing surface directs a crop material rearwardly and said at least one trailing surface interrupter extending above the trailing surface redirects the crop material rearwardly as well as outwardly toward said at least one concave.

9. The rasp bar of claim 8, wherein:
said at least one trailing surface interrupter being at the angle β which is between about 95 and about 120 degrees from a lower surface of said rasp bar.

10. The rasp bar of claim 9, wherein:
said at least one trailing surface interrupter being at an angle β of about 105 degrees from the lower surface of said rasp bar.

11. The rasp bar of claim 8, wherein:
said linear protrusion having a trapezoidal cross section, said trapezoidal cross section being one of an acute trapezoidal cross section, a right trapezoidal cross section, an obtuse trapezoidal cross section, an isosceles trapezoidal cross section, a rectangular trapezoidal cross section, and a square trapezoidal cross section.

12. The rasp bar of claim 8, wherein:
said linear protrusion having a semi-cylindrical cross section.

13. The rasp bar of claim 8, wherein:
said linear protrusion being a broken linear protrusion.

14. The rasp bar of claim 8, wherein:
said rasp bar further having a rasp bar spike, said at least one trailing surface interrupter extending at least partially onto said rasp bar spike.

* * * * *